United States Patent [19]

Velman

[11] 4,440,408
[45] Apr. 3, 1984

[54] RECREATIONAL SLEIGH

[76] Inventor: Boris A. Velman, 25 Cedarcroft Blvd., Apt. 606, Willowdale, Ontario, M2R 2Z3, Canada

[21] Appl. No.: 312,196

[22] Filed: Oct. 19, 1981

[51] Int. Cl.³ .............................................. B62D 55/00
[52] U.S. Cl. ........................... 280/7.12; 280/11.1 ET; 280/12 KL; 280/28.5
[58] Field of Search ................. 280/8, 11.1 ET, 11.22, 280/12 A, 12 K, 12 KL, 12 L, 21 A, 28.5, 87.01, 7.12; 305/19, 60

[56] References Cited

U.S. PATENT DOCUMENTS

| | | | |
|---|---|---|---|
| 1,364,686 | 1/1921 | Behm | 280/7.12 |
| 2,589,764 | 3/1952 | Basso | 280/12 AA |
| 2,625,229 | 1/1953 | Van Voorhees | 280/11.1 ET |
| 3,695,626 | 10/1972 | Alexander, Jr. | 280/12 K |
| 3,915,468 | 10/1975 | Hoareau | 280/28.5 |
| 4,193,609 | 3/1980 | Bissett | 280/12 K |

FOREIGN PATENT DOCUMENTS

| | | | |
|---|---|---|---|
| 762342 | 7/1967 | Canada | 280/12 K |
| 147871 | 11/1936 | Fed. Rep. of Germany | 280/12 KL |
| 1941 | of 1876 | United Kingdom | 280/11.1 ET |

Primary Examiner—David M. Mitchell
Attorney, Agent, or Firm—Arne I. Fors; Robert F. Delbridge

[57] ABSTRACT

A recreational device for use on snow or grass-covered slopes consisting of a ski having a circular seat mounted thereon with at least one handle, preferably a pair of diametrically opposed handles, projecting radially from said seat or below said seat.

An endless belt with rollers can be affixed to the underside of the ski, together with a pair of outrider wheels, for use of the device on grass slopes.

3 Claims, 7 Drawing Figures

RECREATIONAL SLEIGH

This invention relates to a recreational device and, more particularly, relates to a novel sleigh adapted for use on both snow-covered and snow-free slopes.

Skiing on grass-covered slopes by means of skis having endless belts containing rollers mounted on the underside of the skis is known. It is an object of the present invention to provide a recreational sports device which will permit a user to travel down grass-covered and the like slopes in a controlled manner in a seated position.

It is another object of the present invention to provide a recreational device that can be readily converted to use with a ski for travel down snow-covered inclines.

The structure of my invention comprises, in general, a seat, a ski having means formed thereon permitting travel over ground or a snow surface, support means interconnecting said seat to said ski a predetermined distance apart to permit a user to sit on said seat over the ski and at least one handle adapted to be gripped by the user secured to the seat or to the support means.

In a preferred embodiment of my invention, the seat is circular and a pair of diametrically opposed handles extend radially from the underside of the seat perpendicular to the longitudinal axis of the ski.

In another embodiment of my invention, the ski has a continuous belt mounted on the underside of the ski for travel parallel to the long axis of the ski, said endless belt having a plurality of rollers mounted thereon a substantially equal distance apart adapted to engage and roll on the ground. The support means for securing the seat a spaced distance from the ski comprises a telescoping member having biasing means for normally extending the seat away from the ski such that said member functions as a shock absorber.

A further embodiment of my invention includes a pair of wheels mounted one on each side of said ski within the central one-third of the length of the ski, each of said wheels inclined at an angle of from about 20° to 30° from the vertical axis of the support means and away from each other facing the front end of the ski at an angle of from about 15° to 20° from the longitudinal axis of the ski.

The foregoing objects and the manner in which they can be attained will become apparent from the following detailed description of the invention with reference to the accompanying drawings, in which.

Figure 1:
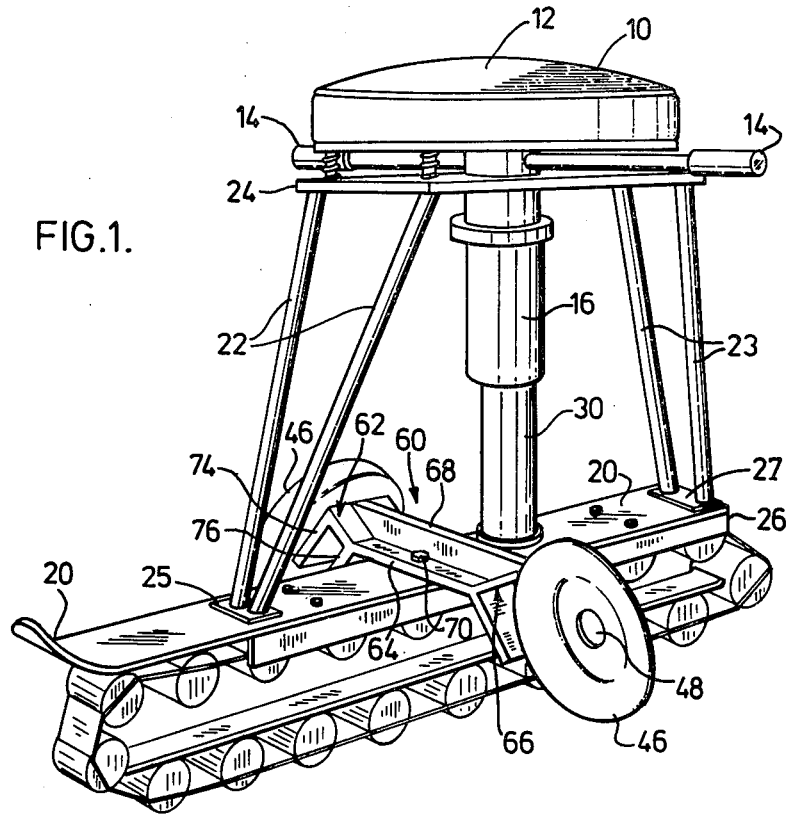
FIG. 1 is a perspective view of an embodiment of the structure of the present invention for use on ground.
Figure 2:
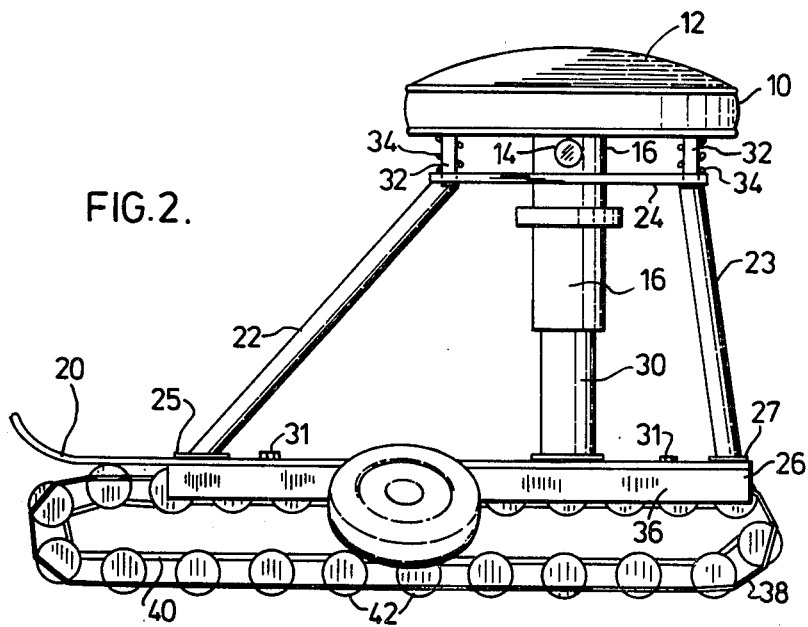
FIG. 2 is a side elevation of the structure shown in FIG. 1.
Figure 3:
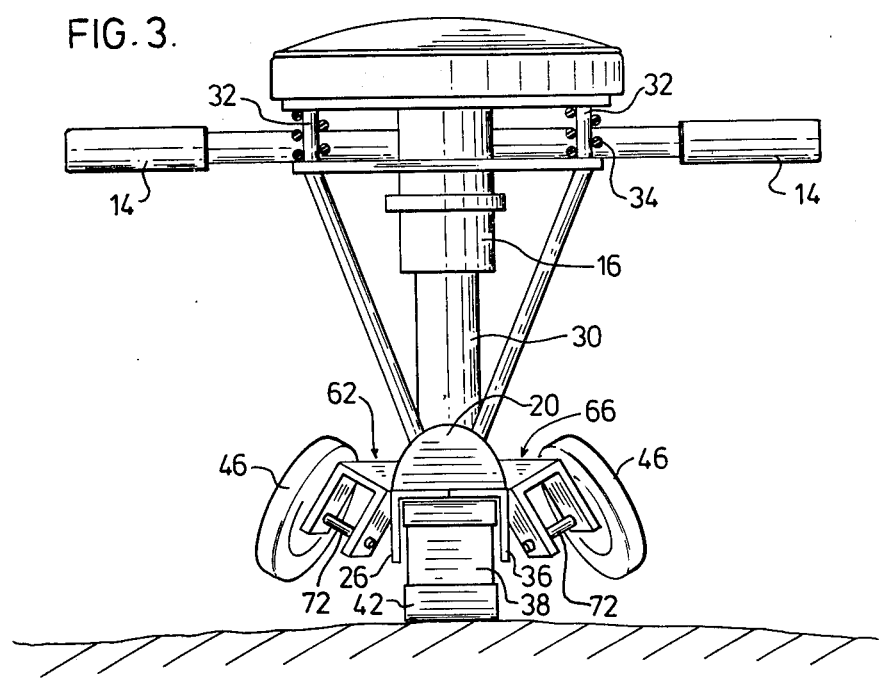
FIG. 3 is front elevation of the structure shown in FIG. 1.
Figure 4:
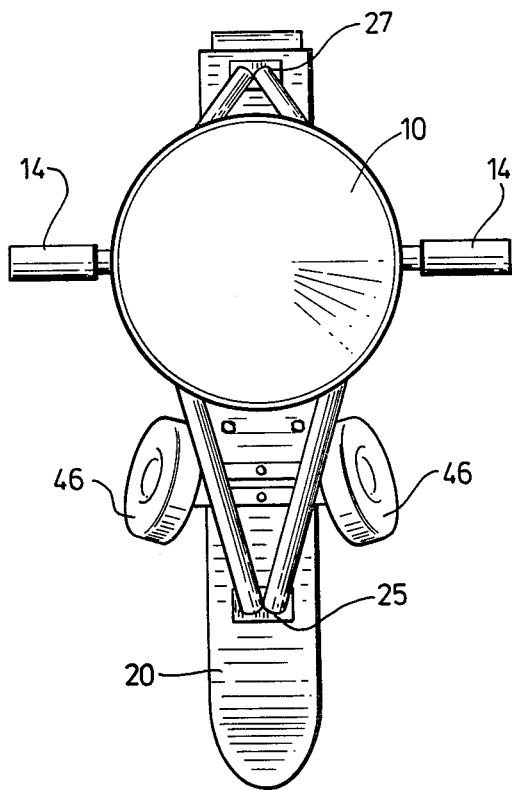
FIG. 4 is a plan view of the structure shown in FIG. 1.
Figure 5:
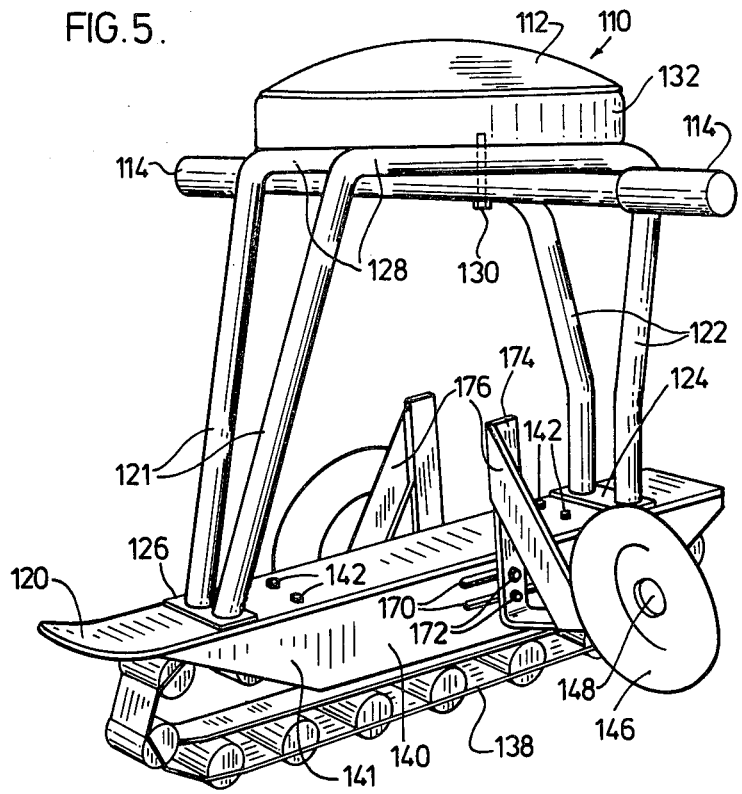
FIG. 5 is a perspective view of another embodiment of the invention for use on ground.

With reference to the FIGS. 1-4 of the drawings, the structure of my invention comprises a seat 10, preferably a circular seat having padding 12, with handles 14 diametrically opposed to each other extending radially from or below seat 10. Handles 14 can be attached to the underside of seat 10, as indicated in FIG. 5, or can pass through or be secured to column 16, as shown most clearly in FIGS. 2 and 3.

Seat 10 is secured to ski 20 by means of a plurality of support struts 22,23 which are secured at their upper ends to a plate 24 and at their lower ends to a ski or base member 20 by means of bearing plates 25,27. As indicated more clearly in FIGS. 2 and 3, four short vertical shafts 32 secured to the corners of plate 24, such as by welding, project upwardly through openings in plate 28, to which seat 10 is secured, with compression springs 34 disposed between plates 24,28 about each shaft 32 to bias seat 10 upwardly away from support plate 24.

Central column 16, slidably mounted in plate 24 and secured to plate 28 at its upper end, has a telescoping component 30 rigidly secured to ski 20 and slidably mounted within the central column. Component 30 is biased in an extended position by means of a compression spring, not shown, such that seat 10 is normally extended upwardly away from ski 20 and the central column 16 and shafts 32 function effectively as shock absorbers.

Ski 20 has inverted channel 26 with side flanges 36 secured thereto. Channel 26 is adapted to support endless belt 38 travelling about race 40 by means of a plurality of rollers 42 secured to belt 38, well known in the art. Channel 26 is connected to the ski by connectors such as bolts, typified by numeral 31, for removal of belt 38 for use of the sleigh on snow, as typified by the embodiment shown in FIG. 7.

I have found that the pair of outrigger wheels 46 spaced laterally from ski 20 on each side thereof and journalled for rotation on a plane above the plane of the endless belt 38 is necessary for turning of the sleigh when used on ground. Each wheel 46 preferably is inclined at an angle of from about 20 to about 30 degrees from the vertical axis of the support means facing away from each other towards the front end of the ski at an angle of from about 15 to 20 degrees from the longitudinal axis of the ski. The plane of the bearing surface of each of wheels 46 is spaced above the plane of belt 38 a distance sufficient to allow wheel 46 to be substantially perpendicular to the horizontal when the sleigh is balanced on rollers 42 and one of the wheels during a turning manoever, to be described.

Figure 6:
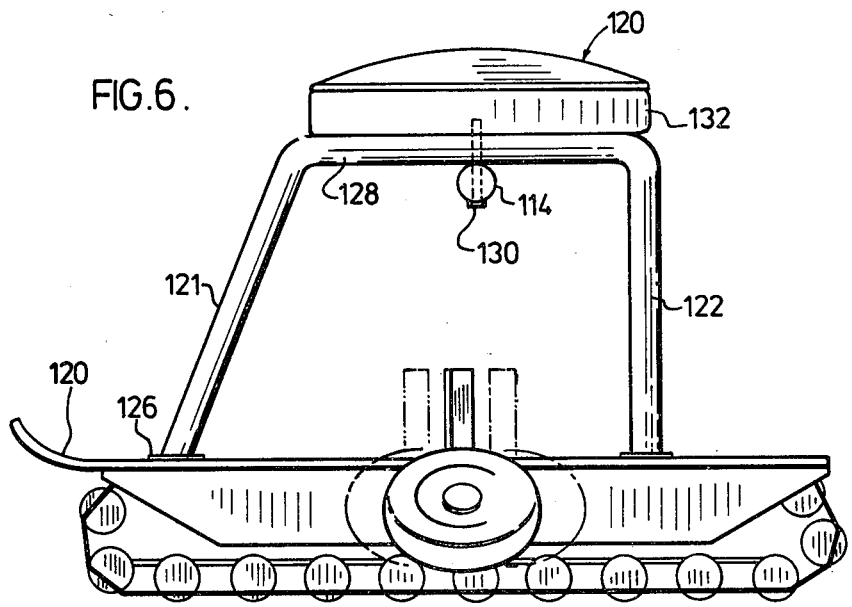
FIG. 6 is a side elevation of the embodiment shown in FIG. 5.

Each of outrigger wheels 46 is located relative to the ski 20 within the central one-third of the length of the ski, as depicted by the ghost lines in the elevation of FIG. 6.

A support assembly 60 comprising a pair of spaced-apart outrigger forks 62,66 interconnected by intermediate web 64 having a reinforcing rib 68 is secured to the upper surface of ski 20 by connectors, such as bolt 70 on each side of rib 68 passing through elongated slot 71 formed in ski 20, for ease of removal and facile longitudinal adjustment. Each of forks 62,66, in the embodiment illustrated, has a pair of spaced-apart flanges 74,76 depending from forks 62,66 for receiving a support axle 48 for rotation of wheels 46 thereon or for rotation of wheels 46 within flanges 74,76.

FIGS. 5 and 6 illustrate another embodiment of my invention in which seat 110, preferably a circular seat having padding 112, has handles 114 extending radially below seat 110 diametrically opposed to each other transversely to the long axis of ski 120.

A tubular framework having support struts 122 secured to ski 120 by base plates 124,126 diverge outwardly from each other laterally and converge towards each other longitudinally to be interconnected by horizontal sections 128 which provide a support for seat 110 and handles 114 by connector means such as bolts 130 threaded into the base 132 of seat 110.

Ski 120 supports inverted channel 140 which is connected thereto by a connector such as threaded bolts 142, channel 140 supporting endless belt 38 as previously described. Outrigger wheels 146 journalled on axles 148 are supported on either side of ski 120 a predetermined distance apart as discussed hereinabove by means of brackets 174 with reinforcing gussets 176 by means of bolts 172 passing through longitudinal slots 170 formed in the sidewalls 141 of channel 140.

Figure 7:
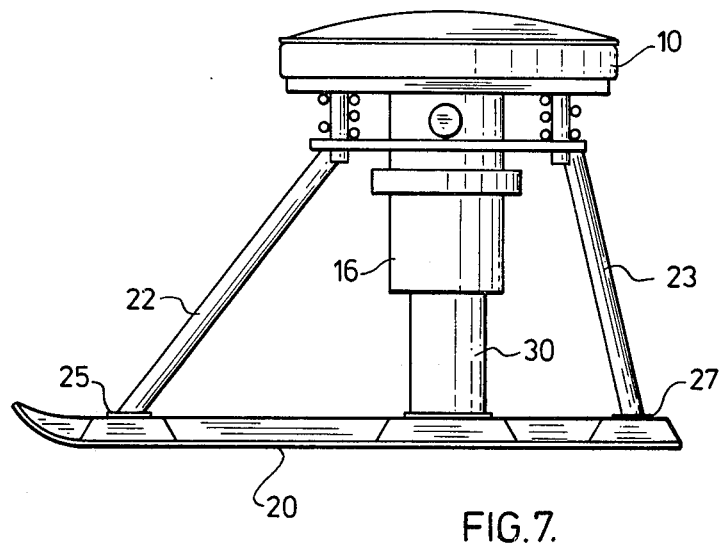
FIG. 7 is a side elevation of a further embodiment of the present invention for use on snow.

The embodiments of my invention illustrated in FIGS. 1 through 6 are shown to have an upturned tip 20' at the leading end of ski 20 to permit removal of inverted channels 26 or 140 with attached endless belt 38 and use of the sleigh on snow covered surfaces. FIG. 7 illustrates another embodiment of my invention in which the ski 20 is deepened in cross section by means of a longitudinal central rib 21 and pedestals 25', 27' and 30' to which the support members 22, 23 and 30, respectively, are connected.

In use, the operator turns the sleigh on grass or earth by tipping the sleigh on the side in which it is desired to turn such that a wheel 46 engages the ground surface allowing the operator to pivot about the wheel. Wheels 46 can be adjusted longitudinally preferably in the central one-third of the ski to suit the operator.

For use on snow covered surfaces inverted channel 140 and the outrigger assemblies are removed and the ski 120 slides directly on the snow surface. Ski 120 may have a longitudinally convex or arcuate surface with the centre of the bottom surface of the ski having an increase of depth of about 3/16 to ¼ inch for a ski length of about 25 to 30 inches. The operator normally leans in the direction in which he wishes to turn and pivots about the leg trailing in the snow on that particular side of the sleigh.

The present invention provides a number of important advantages in that it can be used winter and and summer on snow or on dry land. Good control of the direction of travel of the sleigh similar to that provided by conventional snow skis allows the operator to descend a slope under controlled conditions of direction and speed. It will be understood, of course, that modifications can be made in the embodiment of the invention illustrated and described herein without departing from the scope and purview of the invention as defined by the appended claims.

What I claim as new and desire to protect by Letters Patent of the United States is:

1. A recreational device comprising a seat, a ski having means formed thereon permitting travel over a ground surface, support means interconnecting said seat to said ski a predetermined distance apart to permit a user to sit on said seat over the ski, a pair of opposed handles which extend laterally from the underside of the seat perpendicular to the longitudinal axis of the ski, a continuous belt mounted on the underside of the ski, said endless belt having a plurality of rollers mounted thereon a substantially equal distance apart adapted to engage and roll on the ground, and a pair of wheels mounted one on each side of said ski within a central one-third of the length of the ski, each of said wheels being inclined at an angle of from about 20° to 30° from the vertical axis of the support means and inclined away from each other facing the front end of the ski at an angle of from about 15° to 20° from the longitudinal axis of the ski.

2. A recreational device as claimed in claim 1, in which said support means interconnecting the seat to the ski includes a plurality of support struts comprising a pair of struts secured to the ski near the front end thereof diverging upwardly laterally for securement to the front end of the seat and a pair of rear struts secured to the ski at the rear end thereof diverging upwardly laterally for securement to the rear end of the seat.

3. A recreational device as claimed in claim 2, in which said front and rear pairs of struts are secured to a rectangular base plate whereby said base plate is disposed a spaced distance from the ski substantially parallel thereto, said seat having a plate secured thereto substantially coextensive with said base plate, a shaft secured to each corner of one of said plates and passing through the opposite plate, and a compression spring interposed between the plates about each shaft for biasing the seat away from the support plate.

* * * * *